(12) United States Patent
Varadarajan et al.

(10) Patent No.: US 10,447,607 B2
(45) Date of Patent: Oct. 15, 2019

(54) SYSTEM AND METHOD FOR DEQUEUE OPTIMIZATION USING CONDITIONAL ITERATION

(71) Applicant: Microsoft Technology Licensing, LLC, Redmond, WA (US)

(72) Inventors: Krishnan Varadarajan, Redmond, WA (US); Jieqing Wang, Sammamish, WA (US); Venkates Paramasivam Balakrishnan, Redmond, WA (US); Shane K. Mainali, Duvall, WA (US); Quan Zhang, Kenmore, WA (US); Zichen Sun, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/588,477

(22) Filed: May 5, 2017

(65) Prior Publication Data

US 2018/0324129 A1 Nov. 8, 2018

(51) Int. Cl.
*G06F 15/16* (2006.01)
*H04L 12/863* (2013.01)
*H04L 12/875* (2013.01)

(52) U.S. Cl.
CPC ............ *H04L 47/50* (2013.01); *H04L 47/566* (2013.01)

(58) Field of Classification Search
CPC .................................. H04L 51/18; H04L 51/12
See application file for complete search history.

(56) References Cited

U.S. PATENT DOCUMENTS 6,058,389 A * 5/2000 Chandra ................. G06F 9/546
2006/0143150 A1 * 6/2006 Hobson ............... G06Q 10/107

* cited by examiner

*Primary Examiner* — Hua Fan
(74) *Attorney, Agent, or Firm* — Fiala & Weaver P.L.L.C.

(57) ABSTRACT

Methods for dequeue optimizations in queues are performed by systems and apparatuses. The methods optimize dequeue operations using aggregation of expired messages enqueued in a queue and conditional iteration over enqueued messages based on the aggregation to service dequeue commands. Queues utilize page hierarchies such as root pages, index pages, and data pages. The aggregation of expired messages for pages in the queue determines the latest expired time for messages for a given page, and these latest expired times are stored in their respective pages, including data pages, index pages, and root pages, for use in the conditional iteration. The conditional iteration bypasses pages for which a latest expired time for all messages is prior to the current time when servicing dequeue requests for the queue.

20 Claims, 5 Drawing Sheets

SYSTEM AND METHOD FOR DEQUEUE OPTIMIZATION USING CONDITIONAL ITERATION

BACKGROUND

Queue structures may be used for workflows, such as producer-consumer workflows, to queue tasks or messages provided, or acted upon, by different participants or users (e.g., application components or other software entities) of the workflow. For example, a first software entity may enqueue a message in a queue that is subsequently, within an expiry time of the message, dequeued by a second software entity and acted upon for purposes of the workflow. Dequeue commands for these queues may result in significant latency when many messages have expired. That is, each dequeue request may move a queue header cursor in a nested table forward through each entry in the queue until the header cursor reaches the end of the queue or the first non-expired message in the queue.

In some queue structures, a garbage collection mechanism may be utilized to clear expired queue tasks or messages to reduce the latency of searching over large numbers of expired queue tasks or messages. In cases where thousands or millions of expired tasks or messages remain queued, garbage collection is unable to perform a cleanup of the expired entries at a rate that prevents system time-outs or conflicts for extended dequeue searches of the queue structure.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods, systems, and apparatuses for dequeue optimization using conditional iteration are described for queues. For example, methods may be performed in server computers and/or computing devices from which software entities provide/enqueue messages to a queue that are consumed/dequeued by other software entities. In one example, a computer-implemented method for dequeuing messages in a queue that is temporally ordered is provided. The queue includes a first index page linked with a first data page and a second data page, and has expired messages that were previously queued stored in the first data page. The computer-implemented method includes queuing at least one valid message, each having an expiry time, in the second data page. The computer-implemented method also includes aggregating expired messages for the first data page to determine a latest expiration time for the expired messages in the first data page, and storing the latest expiration time in the first data page and/or in the first index page based on the aggregating. The method also includes receiving by the queue a request to dequeue a valid message, determining a next valid message is in the second data page based on a comparison of a current time and the latest expiration time of the first data page, and bypassing the first data page to dequeue the valid message, corresponding to the dequeue request, from the second data page.

In another example, a system for dequeuing messages in a queue that is temporally ordered is described. The system may include a non-volatile storage device(s) configured to store queue logic for providing and managing a queue, the queue being configured to include at least one data page. The system may also include a processor(s) configured to perform operations on the queue based on the queue logic. In the example system, the queue logic includes enqueue logic configured to enqueue valid messages, each having an expiry time, in a tail data page that includes a tail of the queue. The example system also includes aggregator logic configured to, for each data page of the queue, aggregate expired messages to determine an expiration time of the expired messages, and store a latest expiration time, the latest expiration time representing a latest value of the aggregated expired messages of its associated data page, with its associated data page. In the example system, dequeue logic is configured to receive requests to dequeue valid messages, and iterator logic is configured to determine a queue location in the data pages for the next valid message based on a comparison of a current time and the latest expiration time for a data page, and to bypass the data page to dequeue valid messages corresponding to the request to dequeue from a data page based on the queue location.

In still another example, a computer readable memory storing program instructions that, when executed by one or more processing devices, performs a method, is described. The method includes aggregating expired messages in a queue to determine expiration times for the expired messages, where the queue comprises a first root page, a first index page linked to the first root page, and a first data page and a second data page linked with the first index page. The method also includes determining a location in the queue for a next valid message based on a comparison of a current time and the expiration times, and bypassing at least one of a root page of the queue, an index page of the queue, or a data page of the queue to dequeue a valid message based the location.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further explain the principles of the example embodiments and to enable a person skilled in the pertinent art to make and use the example embodiments.

Figure 1:
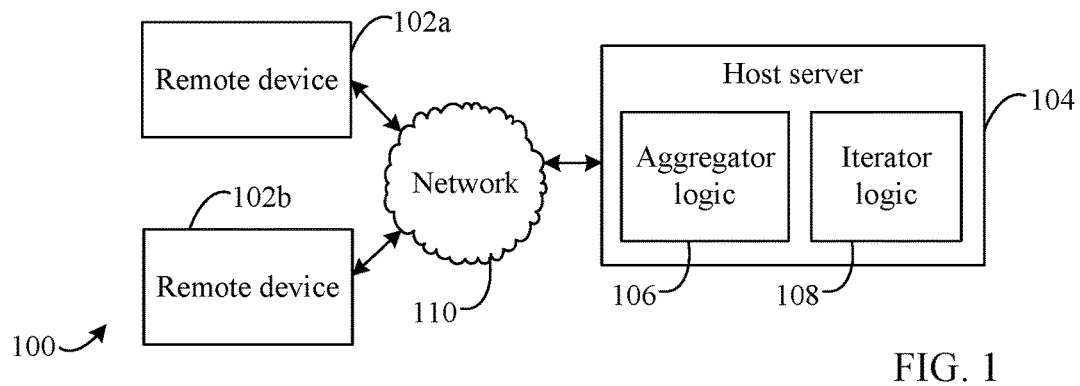
FIG. 1 shows a block diagram of a system for dequeue optimization using conditional iteration, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an example embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for dequeue optimization using conditional iteration. In particular, sub-sections A and B of Section II describe example queue embodiments and storage tree embodiments, respectively.

Section III below describes an example processor-based computer system that may be used to implement features of the example described herein.

Section IV below describes some additional examples and advantages.

Section V provides some concluding remarks.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

When different software entities are configured to participate in a workflow, orchestration of the workflow may be accomplished at least in part by communication using messages stored in a queue. For instance, a producer-consumer workflow implementing a queue for messaging may allow software entities to provide/enqueue tasks and/or messages to a project queue that are consumed/dequeued by other software entities. In other words, these tasks and/or messages can be provided, or acted upon, by different software entities associated with the workflow.

For example, a queue for tasks and messages shared between different software entities involved in a project may be used to support a workflow service for compiling source code to generate builds for the project. In such a case, developers may add source code (e.g., program code, etc.), design code (e.g., code for designing processors, application-specific integrated circuits (ASICs), etc.), file libraries, media/multi-media objects like pictures, audio files, animations, movie files, and/or the like, via a software entity, e.g., a software program, to file/code repositories through a gated check-in mechanism such as a build queue of a development environment. A development project may use Visual Studio® Team Services or other elements of the Microsoft® Visual Studio® development suite provided by Microsoft Corporation of Redmond, Wash. Similarly, a queue for tasks and messages may be implemented for bug tracking and bug fixes on software and hardware development projects. In embodiments, any software entity may enqueue and dequeue messages and tasks in a queue that orchestrates project development for different types of projects. In other embodiments, project queues may be used for action items that not related to submission/check-in activities to be performed by developers, and/or for action items to be performed by software entities.

However, for applications and services for which many messages may be enqueued, e.g., thousands or millions of messages, search times for dequeue commands and requests experience latency that impede system performance and functionality. For instance, queues may implement expiry times for enqueued messages/tasks, and when many expired messages/tasks remain enqueued in a queue, a search for the next available/un-expired or next valid message/task must traverse the entire queue from the head of the queue to locate the desired message/task.

The techniques and embodiments herein provide for dequeue optimization of messages/tasks using aggregation and conditional iteration that eliminate or mitigate this issue.

In embodiments, expired messages in a queue may be aggregated. This aggregation may be performed in a bottom-up manner, according to embodiments, or other manners as will be understood by persons of skill in the relevant art(s) having the benefit of this disclosure. For instance, a queue may be organized to accommodate large numbers of messages/tasks, as described herein. A queue, according to embodiments, may include a hierarchical structure implementing one or more of a root page(s), an index page(s), or a data page(s). Root pages are the top level of the organizational hierarchy and may include information related to the queue, such as but without limitation, a queue name or identifier, index pages linked to the root page, a latest expiration time for the messages/tasks enqueued under the root page, etc. A root page may be linked with one or more index pages, which in turn may be linked with one or more data pages that store the enqueued messages/tasks. Index pages may include information, such as but without limitation, an index page name or identifier, data pages linked to the index page, a latest expiration time for the messages/tasks enqueued under the index page, etc. Data pages may include information, such as but without limitation, a data page name or identifier, a latest expiration time for the messages/tasks enqueued in the data page, etc.

The described techniques and embodiments for dequeue optimization of messages/tasks using conditional iteration may perform aggregation of the expired messages beginning with the data pages. Enqueued messages/tasks in a given data page that are expired are aggregated by traversing the messages in the data page to identify those that are expired. During or subsequent to this identification, an expired message with a latest expiry time (i.e., the most recently expired message/task, or the message/task with the maximum expiry time value) is determined and identified for the data page. This data page aggregation process is repeated for, i.e., iterated over, each data page under the index page to determine and identify the latest expiry time for the remaining data pages linked to the index page. Of the messages/tasks with the latest expiry times for the data pages under the index page, an overall latest expiry time is determined and identified for the index page. This "max" expiry time is then provided to the index page linked to the data pages, and is stored in the index page as the latest expiry time for all data pages under the index page of the queue.

The overall index page aggregation process is repeated for, i.e., iterated over, each index page under the root page to determine and identify the latest expiry time for the index pages linked to the root page. The "max" root page expiry time is then provided to the root page where it is stored as the latest expiry time for all data pages under the root page of the queue.

In embodiments, each data page of an index page may be aggregated followed by providing a latest expiry time to the index page, or all data pages of the queue may be aggregated followed by providing a latest expiry time to respective index pages of the data pages, or other ordered combinations of aggregation and provision may be performed.

Subsequent to aggregation being performed on one or more of a root page, an index page, or a data page, a search for the next valid message/task in the queue may be performed. The search may be performed in a top-down manner, according to embodiments, or other manners as will be understood by persons of skill in the relevant art(s) having the benefit of this disclosure. For example, a search may iterate over one or more of root pages, index pages, or data pages while bypassing or skipping root pages, index pages, and data pages for which the current time is greater than the latest expiry time associated therewith. In this way, the techniques and embodiments described herein can bypass data pages that do not include any valid messages/tasks.

According to embodiments, aggregations may be performed at any time there are expired messages/tasks enqueued, including but not limited to, after predetermined time intervals, after a threshold number of messages/tasks or expired messages/tasks are enqueued, after a search time exceeds a threshold, etc.

Examples described herein enable efficient, yet robust, intelligent dequeuing for items having expiry times that are stored in a queue. The described embodiments and techniques provide for dequeue optimization using aggregation and conditional iteration. In the following description, application components, operating systems and their components, scripts, and/or or other computer software/software entities that utilize a queue methodology (i.e., enqueue/dequeue of items) according to the techniques and embodiments described herein may be referred to as a "software entity". A "host server" as referred to herein comprises one or more server computers or computing devices that receive enqueue requests from software entities and perform aggregation and dequeuing of queued items according to the described embodiments and techniques. "Remote devices" are considered to be any type of computing devices that execute software entities which provide enqueue/dequeue commands to queues, such as but not limited to, devices in the cloud, client computers like desktops, workstations, laptops, etc., on-premises servers and/or enterprise servers, mobile/personal devices, and/or the like. Additionally, while the embodiments described below refer to queued "messages," this term is considered to encompass queued tasks, action items, etc., for purposes of the following description.

A. Example Queue Embodiments

Systems and devices may be enabled in various ways for dequeue optimization using aggregation and conditional iteration. For example, FIG. 1 is a block diagram of a system 100 system for dequeue optimization using aggregation and conditional iteration, according to an embodiment. As shown in FIG. 1, system 100 includes a remote device 102*a*, a remote device 102*b*, and a host server 104, which may communicate over a network 110. It should be noted that the number of remote devices and host servers is exemplary in nature, and may include more or fewer of each in various embodiments.

Remote device 102*a*, remote device 102*b*, and a host server 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

Remote device 102*a* and remote device 102*b* may be any type of computing device or terminal that may be used to execute software entities. Remote device 102*a* and remote device 102*b* are configured to execute software entities that provide enqueue and dequeue requests/commands to a queue, as described herein, of host server 104 over network 110.

Host server 104 may comprise one or more server computers and may be one or more distributed or "cloud-based" servers. Host server 104 is configured to receive enqueue and dequeue requests/commands from remote device 102*a* and/or remote device 102*b* via network 110. As illustrated, host server 104 includes aggregator logic 106 and iterator logic 108.

Aggregator logic 106 is configured to aggregate expired messages in a queue of host server 104 to determine latest expiration times for portions of the queue. Iterator logic 108 is configured to iterate over portions of the queue to locate a next valid message to be dequeued. Accordingly, host server 104 is configured to utilize aggregator logic 106 and iterator logic 108 for dequeue optimization using aggregation and conditional iteration.

Figure 2:
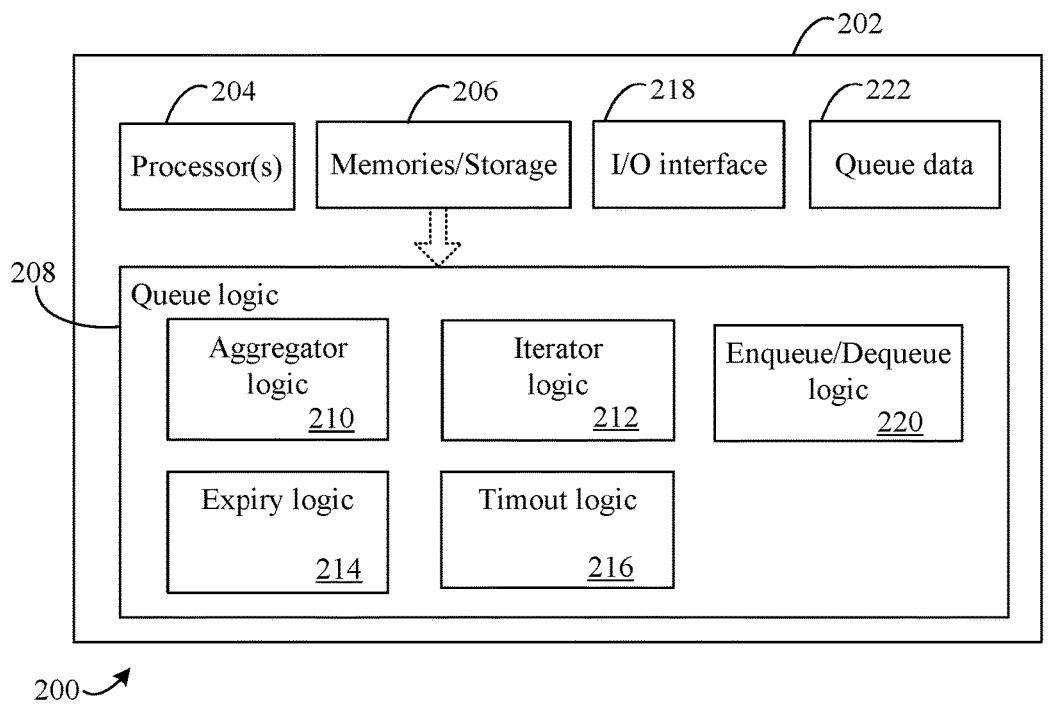
FIG. 2 shows a block diagram of the host server of the system shown in FIG. 1, according to an example embodiment.

FIG. 2 is a block diagram of a system 200 for dequeue optimization using aggregation and conditional iteration, according to an embodiment. As shown in FIG. 2, system 200 includes a host server 202. System 200 may be a further embodiment system 100 of FIG. 1, and host server 202 may be a further embodiment of host server 104 of FIG. 1. Host server 202 may be any type server computer or computing device, as mentioned elsewhere herein, or as otherwise known. As shown in FIG. 2, host server 202 includes one or more of a processor 204, one or more of a memory and/or other physical storage device ("memory") 206, an input/output (I/O) interface 218, queue data 222, and queue logic 208. System 200 may also include additional components (not shown for brevity and illustrative clarity) such as, but not limited to, those described below with respect to FIG. 12.

Processor 204 and memory 206 may respectively be any type of processor or memory that is described herein, or as would be understood by a person of skill in the relevant art(s) having the benefit of this disclosure. Processor 204 and memory 206 may each respectively comprise one or more processors or memories, different types of processors or memories, and/or distributed processors or memories. Processor 204 is configured to execute computer program instructions, e.g., for dequeue optimization using aggregation and conditional iteration, etc., as described herein, and memory 206 is configured to store such computer program instructions, as well as to store other information and data described in this disclosure, including but without limitation, queue data 222.

I/O interface 218 may be any type of wired and/or wireless network adapter, modem, etc., configured to allow host server 202 to communicate with other devices over a network, e.g., such as remote device 102a and/or remote device 102b described above with respect to FIG. 1.

While not shown for illustrative clarity, host server 202 may include an operating system (OS) that may be any operating system used by computing devices described herein such as, but without limitation, Microsoft® Windows® from Microsoft Corporation of Redmond, Wash., OS X® from Apple, Inc. of Cupertino, Calif., UNIX® from The Open Group, and/or the like. In embodiments, an OS may be accessed by a remote device via a network connection to a server (e.g., host server 202) where such remote devices operate as workstations or terminals, and/or the like.

Queue data 222 may comprise data associated with a queue, such as but not limited to, a queue name, one or more messages enqueued in a queue, visible times (e.g., when a message was enqueued), expiry times for messages, message identifiers (IDs), message senders, message recipients, and/or the like, as described herein. A queue may be used, for example and without limitation, to orchestrate workflows for development and/or design projects, etc. Queue data 222 may be configured, for example and without limitation, to be associated with online or "cloud" services for workflows. In embodiments, queue data 222 may be stored in a portion of memory 206.

Queue logic 208, as illustrated, includes a plurality of components for performing the techniques described herein for dequeue optimization using aggregation and conditional iteration. As shown, queue logic 208 includes aggregator logic 210 that may be an embodiment of aggregator logic 108 of FIG. 1, iterator logic 212 that may be an embodiment of iterator logic 106 of FIG. 1, expiry logic 214, timeout logic 216, and enqueue/dequeue logic 220. While shown separately for illustrative clarity, in embodiments, one or more of aggregator logic 210, iterator logic 212, expiry logic 214, timeout logic 216, or enqueue/dequeue logic 220 may be included together with each other and/or as a part of queue logic 208.

Figures 3, 4:
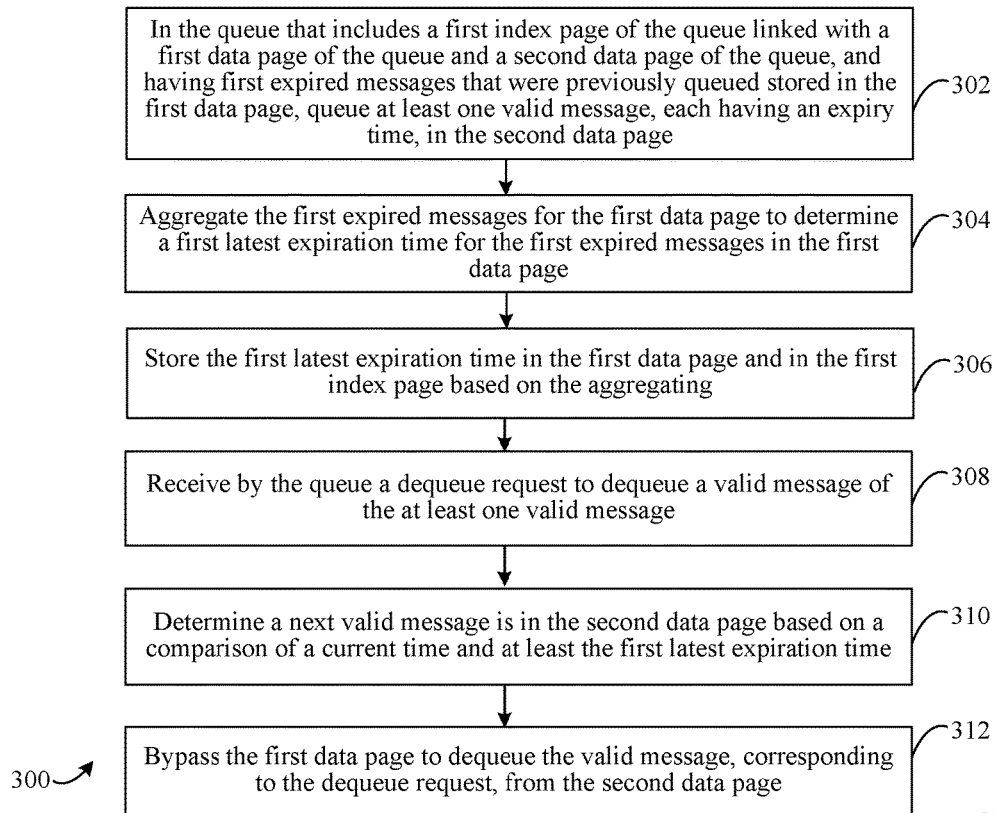
FIG. 3 shows a flowchart for dequeue optimization using conditional iteration, according to an example embodiment.
FIG. 4 shows a queue with queued messages, according to an example embodiment.

Referring also to FIG. 3, a flowchart 300 for dequeue optimization using aggregation and conditional iteration is shown, according to an example embodiment. For purposes of illustration, flowchart 300 of FIG. 3 is described with respect to system 200 of FIG. 2 and its subcomponents, and also with reference to FIGS. 4 and 5. That is, host server 200 of FIG. 2 may perform various functions and operations in accordance with flowchart 300 for dequeue optimization using aggregation and conditional iteration of message for a queue with regard to enqueue/dequeue commands received from remote device 102a and/or remote device 102b of system 100 in FIG. 1. Further structural and operational examples will be apparent to persons skilled in the relevant art(s) based on the following description. Flowchart 300 is described as follows.

In step 302, in the queue that includes a first index page of the queue linked with a first data page of the queue and a second data page of the queue, and having expired messages that were previously queued stored in the first data page, at least one valid message is queued, each having an expiry time, in the second data page. For example, queue logic 208 and/or queue data 222 may be loaded in, or accessed from, memory 206 for execution and/or processing by processor 204 to provide a queue in which messages may be enqueued and dequeued using aggregation and conditional iteration, as described herein.

Referring also to FIG. 4, a queue 400 with enqueued messages is shown, according to an example embodiment. Queue 400 is generated according to queue data 222 of FIG. 2. Queue 400 is executed and maintained on host server 202 of FIG. 2, according to embodiments. Queue 400 is exemplary in nature for illustrative and discussion purposes, and is not considered to be limiting. As referred to below, when information, data, enqueue/dequeue commands, etc., are provided to a queue, such as queue 400, it is contemplated herein that this also means such provision may be made to queue logic 208. Additional components and information may be included in queue 400, in various embodiments, such as but without limitation, a queue name, one or more messages enqueued in a queue, visible times (e.g., when a message was enqueued), expiry times for messages, message identifiers (IDs), message senders, message recipients, and/or the like. Queue 400 may enqueue any number of messages for dequeue, and may maintain any number of expired messages, as described herein. Enqueue/dequeue logic 220 of FIG. 2 is configured to enqueue messages for a queue, such as queue 400 of FIG. 4. Messages to be enqueued in queue 400 by enqueue/dequeue logic 220 may be received from remote device 102a and/or remote device 102b via I/O interface 218.

As noted above, software entities may submit enqueue commands associated with messages that include details, information, or other data (e.g., details, information, or other data related to a project workflow) to queue 400. Enqueued messages in queue 400 are submitted with expiry times, according to embodiments, and after the expiry time passes, the message becomes expired and cannot be dequeued. Thus, a queue such as queue 400 may become significantly filled with expired messages over time until such messages are removed by a garbage collection mechanism.

For instance, queue 400 exemplarily has a current time 412 of "04/21/2017 12:05:00" and shows the following messages enqueued therein: a message 402 having an identifier (ID) of 1, a visible time of "04/21/2017 12:01:00" (i.e., when message 402 was submitted), an expiry time of "04/21/2017 12:03:00" (i.e., when message 402 expired), and expired status of "Y" (i.e., yes); a message 404 having an ID of 2, a visible time of "04/21/2017 12:02:00", an expiry time of "04/21/2017 12:04:00", and expired status of "Y"; a message 406 having an ID of 3, a visible time of "04/21/2017 12:02:00", an expiry time of "04/21/2017 12:04:00", and expired status of "Y"; a message 408 having an ID of 4, a visible time of "04/21/2017 12:04:00", an expiry time of "04/21/2017 12:06:00", and an expired status of "N" (i.e., no); and a message 410 having an ID of x, a visible time of "04/21/2017 12:05:00", an expiry time of "04/21/2017 12:07:00", and an expired status of "N". As illustrated, the message ID shown may provide the order of submission of messages, although other types of ID are contemplated herein, such as a key-value pair. In embodiments, the key may be the queue name and the value may be the message or a message ID. In some embodiments, an index of the key for a message may comprise the visibility time. As shown in queue 400, message 402, message 404, and message 406, are expired because their respective expiry times are earlier than current time 412, while message 408 and message 410 are valid messages for dequeue and not expired because their respective expiry times are later than current time 412.

Referring back to flowchart 300 of FIG. 3 and step 302, message 410 is queued according to an enqueue command 414 at current time 412, and is a valid message. In embodiments, message 410 is enqueued responsive to enqueue command 414 (or an enqueue request) from a software entity executing on a remote device, as described herein, via network 110, from a component of host system 202, etc. Enqueue command 414 may include the queue name for which enqueuing is desired (e.g., the queue name of queue 400), an ID of message 410, an expiry time for the message, an ID of the message sender, an ID of the message recipient, and/or the like. When enqueued, message 410 is "placed" in the next available location in queue 400, e.g., at the tail of queue 400, in a next available location in queue 400, etc. In embodiments, queues such as queue 400 may be accessed by software entities of remote devices, e.g., remote device 102a and/or remote device 102b, for enqueuing messages using one or more application programming interfaces (APIs) using universal resource locators (URLs) for host servers (e.g., host server 202) via a domain name server(s) (DNS).

Figure 5:
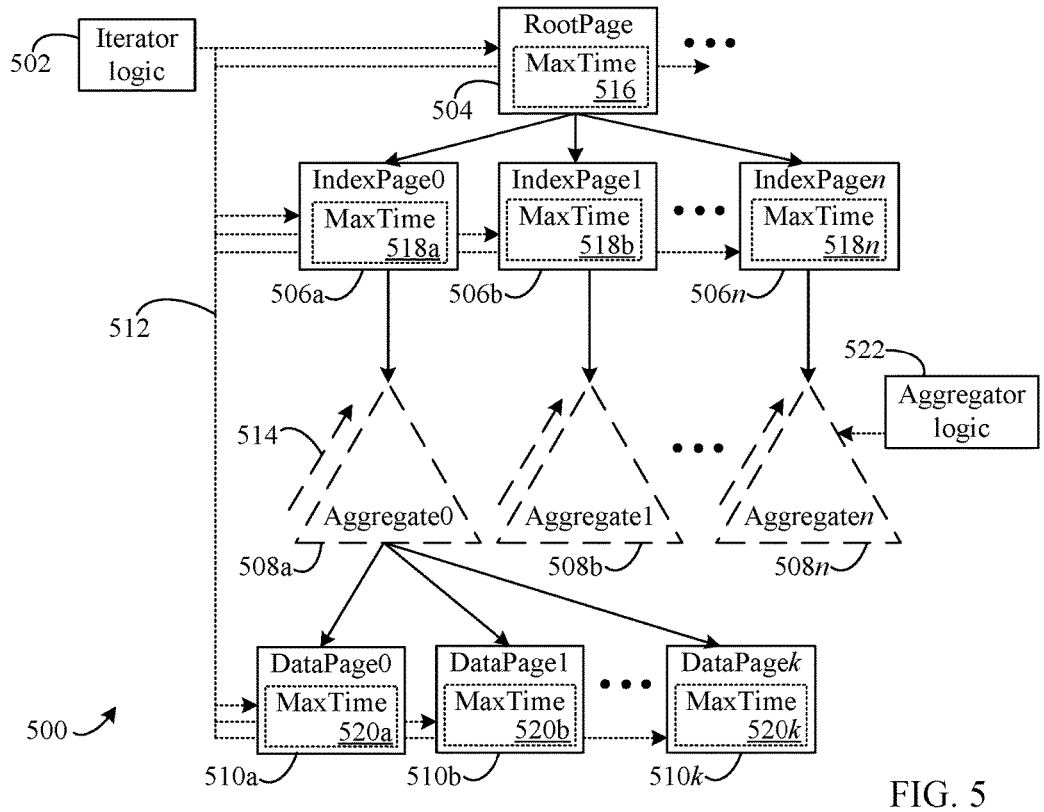
FIG. 5 shows a flow diagram for dequeue optimization using conditional iteration by the host server of FIG. 2, according to an example embodiment.

Referring also to FIG. 5, a flow diagram 500 for dequeue optimization using aggregation and conditional iteration by host server 202 of FIG. 2 is shown, according to an embodiment. Flow diagram 500 depicts one or more components of an embodiment of host server 202. For example, flow diagram 500 includes iterator logic 502 and aggregator logic 522, which may be configured the same or similarly as iterator logic 212 and aggregator logic 210 of FIG. 2, respectively.

Additionally, flow diagram 500 includes exemplary aspects of an embodiment of queue data 222 of FIG. 2. For instance, flow diagram 500 includes a root page 504 that has stored there with a max time 516 representative of the latest time that a message queued under root page 504 has expired. Linked to root page 504 are an index page 506a, an index page 506b, and an index page 506n respectively having a max time 518a, a max time 518b, a max time 518n, each representative of the latest time that a message queued under the respective index pages has expired. A data page 510a, a data page 510b, and a data page 510c each respectively having a max time 520a, a max time 520b, a max time 520k that are each representative of the latest time that a message queued in the respective data pages has expired, are linked to index page 506a.

While not shown for brevity and illustrative clarity, index page 506b and index page 506n may each reference one or more respective data pages. Likewise, the illustrated root page, index pages, and data pages are illustrative in nature for the embodiment shown in FIG. 5, but it is contemplated herein that in other embodiments additional or fewer root pages, index pages, and data pages may be included in queues.

In the illustrated embodiment of FIG. 4, and for purposes of illustration and discussion herein, message 402 and message 404 of queue 400 may be enqueued in data page 510a (e.g., a first data page), and message 406, message 408, and message 410 may be enqueued in data page 510b (e.g., a second data page).

Referring again to flowchart 300 of FIG. 3, in step 304, the expired messages for the first data page are aggregated to determine a first latest expiration time for the expired messages in the first data page. For instance, aggregator logic 522 is configured to aggregate expired messages in data pages, such as data page 510a (e.g., a first data page) to determine a latest expiration time for the expired messages in data page 510a. Aggregator logic 522 may be configured to search data pages in various ways to determine the latest expired message time, such as but without limitation, an ordered search, a binary search, and/or the like.

In embodiments, aggregator logic 522 may be activated/executed to perform aggregation as described herein responsive to a timeout as determined by timeout logic 216 for a valid message search based on a received dequeue command/request, as described below in step 308. That is, timeout logic 216 may trigger aggregator logic 522 to perform its various functions when a timer of timeout logic 216, that is activated upon receipt of the received dequeue command/request, expires before the received dequeue command/request is completed (e.g., in such cases, the number of expired messages in a queue may be high enough to prevent timely completion of received dequeue commands/requests). In other embodiments, aggregator logic 522 may be activated/executed to perform aggregation as described herein based on a timer, a threshold number of expired messages remaining enqueued, a threshold number of new messages being enqueued, etc., and as described elsewhere herein.

In embodiments, as noted above, aggregator logic 522 may aggregate expired messages over each data page under a given index page, or under one or more additional index pages, in performing aggregation as described herein. As illustrated in FIG. 5, aggregator logic 522 is configured to perform aggregation, e.g., for an aggregate 508a, for expired messages in data pages such as data page 510a, data page 510b, and data page 510k (with respect to aggregate 508a). In addition, aggregator logic 522 is configured to provide the max time for aggregated data pages, as described herein, to respective index pages. As illustrated, an aggregate provision 514 shows how aggregator logic 522 provides an overall max time of data page 510a, data page 510b, and data page 510k to index page 506a to be stored therewith as max time 518a. While not shown for illustrative clarity and brevity, aggregator logic 522 is also configured to perform similar aggregation for other sets of data pages under index page 506b (as an aggregate 508b), and under index page 506n (as an aggregate 508n). Similarly, aggregator logic 522 is also configured to perform similar aggregation for each data pages of a queue to store the max expiry time of each data page therewith, and for sets of index pages to store the max expiry time of sets of index pages with a linked root page, as described herein.

Figure 6:
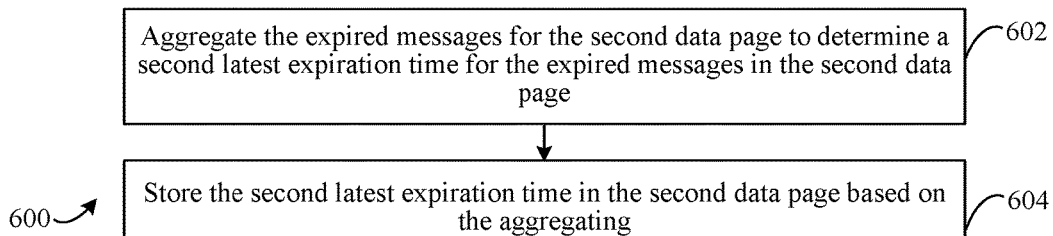
FIG. 6 shows a flowchart for dequeue optimization using conditional iteration, according to an example embodiment.

Referring also to FIG. 6, a flowchart 600 for dequeue optimization using aggregation and conditional iteration is shown, according to an example embodiment. For purposes of illustration, flowchart 600 of FIG. 6 is described with respect to system 200 of FIG. 2 and its subcomponents, and also with reference to FIGS. 4 and 5. That is, host server 200 of FIG. 2 may perform various functions and operations in accordance with flowchart 600 for dequeue optimization using aggregation and conditional iteration of message for a queue with regard to enqueue/dequeue commands received from remote device 102a and/or remote device 102b of system 100 in FIG. 1. In embodiments, flowchart 600 may be a further embodiment of flowchart 300 of FIG. 3, e.g., of step 304 and/or step 306. Further structural and operational examples will be apparent to persons skilled in the relevant art(s) based on the following description. Flowchart 600 is described as follows.

In step 602, the expired messages for the second data page are aggregated to determine a second latest expiration time for the expired messages in the second data page. As similarly described above with respect to step 304, aggregator logic 522 is configured to aggregate expired messages in data pages, such as data page 510b (e.g., a second data page) to determine a latest expiration time for the expired messages in data page 510b. Aggregator logic 522 may be configured to search data page 510b in various ways to determine the latest expired message time in data page 510b, such as but without limitation, an ordered search, a binary search, and/or the like. Continuing with the example above, message 406, message 408, and message 410 are enqueued in data page 510b, and message 410 has the latest expiry time: 04/21/2017 12:07:00. Aggregator logic 522 is configured to determine this latest expiry time based on aggregating message 406, message 408, and message 410 in data page 510b.

It is contemplated herein that the latest expired message time under a given index page may be for a message enqueued in any data page, according to embodiments.

Referring again to queue 400 of FIG. 4, message 402 and message 404, included in this example in data page 510a, may be aggregated by aggregator logic 522 to determine that the most recent or latest expiration time of a message in data page 510a is for message 404: 04/21/2017 12:04:00. That is, current time 410 is 04/21/2017 12:05:00, and message 404 is expired, but with a later expiry time than message 402. Message 406, included in this example in data page 510b, may be aggregated by aggregator logic 522 to determine that the most recent or latest expiration time of a message in data page 510b is for message 406: 04/21/2017 12:04:00. That is, current time 410 is 04/21/2017 12:05:00, and in this example message 404 is the only expired message in data page 510b. In embodiments, each non-expired message (e.g., message 406 and message 408 in this example) be included in the aggregation of aggregator logic 522 to verify that such messages are not expired.

In step 306 of FIG. 3, the first latest expiration time is stored in the first data page based on the aggregating. For example, aggregator logic 522 may be configured to determine the latest expiry time of messages in data page 510a and store, or cause to be stored, this "max time" with data page 510a as max time 520a.

Referring again to flowchart 600 of FIG. 6, in step 604, the second latest expiration time is stored in the first index page based on the aggregating. As similarly described above with respect to step 306 and data page 510b, aggregator logic 522 may be configured to determine the latest expiry time of messages in data page 510b and store this "max time" with data page 510b as max time 520b.

In step 308 of FIG. 3, a request is received by the queue to dequeue a valid message of the at least one valid message. As shown in the embodiment of queue 400 in FIG. 4, a command to dequeue, e.g., at dequeue 416 described in further detail below, may be received at queue 400 by enqueue/dequeue logic 220, e.g., from a remote device such as remote device 102a or remote device 102b. In embodiments, the dequeue command may include a queue name, message ID, and/or the like, as described herein, to identify the stored message to be dequeued. In other embodiments, the dequeue command may include a queue name from which a valid message will be dequeued.

In step 310, a next valid message is determined to be in the second data page based on a comparison of a current time and at least the first latest expiration time. For instance, iterator logic 502 as shown in FIG. 5 is configured to iterate over pages of a queue such as root pages, index pages, and/or data pages by iteration 512 to determine if one or more of these pages includes only expired messages by comparing current time 412 to the max expiry times of the different pages of the queue (e.g., max times 516, 518a-n, 520a-k).

In the example described above, data page 510a has a max time 520a of 04/21/2017 12:04:00, corresponding to message 404, which is prior to current time 412. Accordingly, iterator logic 502 is configured to determine that all messages in data page 510a are expired, hence the next valid message available for dequeue is not in data page 510a. Similarly, as data page 510b has a max time 520b of 04/21/2017 12:07:00, which is after current time 412, iterator logic 502 is configured to determine that valid, non-expired messages are enqueued in data page 510b. Likewise, because max time 520b is later than max time 520a, max time 520b would be stored in association with index page 506 as max time 518a, and thus iterator logic 502 is configured to determine that valid, non-expired messages are enqueued under index page 506a (and similarly under root page 504 based on max time 516 which would be at most as early as max time 518a).

In step 312, the first data page is bypassed to dequeue the valid message, corresponding to the dequeue request, from the second data page. For instance, as noted above in step 310, iterator logic 502 is configured to determine whether different pages of a queue contain only expired messages, or contain valid messages, based on the aggregated message expiry times. As iterator logic 502 iterates over the queue structure, e.g., in a top-down manner (such as beginning with root page 504), pages with only expired messages and no valid messages are bypassed or skipped in the search for the valid messages, such as the next valid message. In the illustrated embodiment, max time 516 of root page 504 and max time 518a of index page 506a each indicate to iterator logic 502 that valid messages are enqueued under these pages, and therefore, root page 504 and index page 506a are not bypassed. However, as noted in step 310, data page 510a has a max time 520a of 04/21/2017 12:04:00, corresponding to message 404, which is prior to current time 412, and iterator logic 502 is configured to bypass data page 510a, as all messages enqueued therein are expired, when iterating over queue 400 according to flow diagram 500.

Max time 520b (i.e., "04/21/2017 12:07:00") of data page 510b indicates that a next valid message is enqueued in data page 510b, and iterator logic 502 is configured to begin an identification of the enqueued message corresponding to the dequeue command/request of step 308, e.g., by comparing message IDs of enqueued messages to the message ID in the dequeue command/request, at data page 510b, thus bypassing any pages in which the desired message is not enqueued based on the max times saved by the pages in the queue. It should be noted that according to embodiments, the next valid message may be the same message that is identified in the dequeue command/request.

Because the enqueued messages of data page 510a are bypassed entirely in the search for the next valid message, the search efficiency for dequeuing messages responsive to a dequeue command is increased. It should be noted that the embodiments shown for queue 400 and flow diagram 500 are exemplary in nature for illustrative purposes, and that hundreds, thousands, or millions of expired messages, spanning any number of data pages, index pages, and/or root pages, may remain enqueued in various embodiments. By allowing for a more efficient search capable of bypassing any number of expired messages to determine the next valid message, system timeouts and lockups may be avoided, processor cycles are reduced on a per-search basis, and faster dequeuing of messages is achieved. For example, the described techniques and embodiments allow for a reduction in search time of up to several minutes for servicing dequeue commands.

Figure 7:
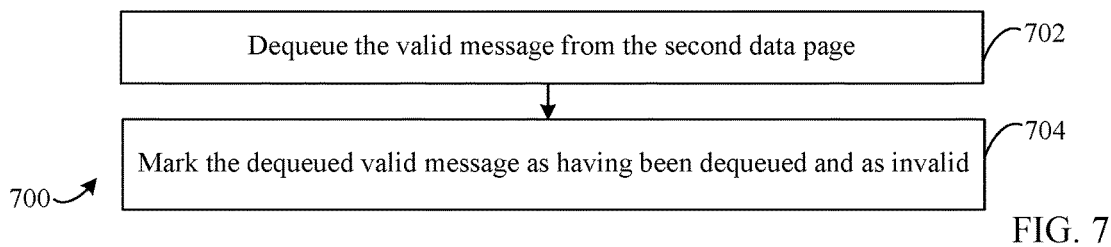
FIG. 7 shows a flowchart for dequeue optimization using conditional iteration, according to an example embodiment.

Referring now to FIG. 7, a flowchart 700 for dequeue optimization using aggregation and conditional iteration is shown, according to an example embodiment. For purposes of illustration, flowchart 700 of FIG. 7 is described with respect to system 200 of FIG. 2 and its subcomponents, and also with reference to FIGS. 4 and 5. That is, host server 200 of FIG. 2 may perform various functions and operations in accordance with flowchart 700 for dequeue optimization using aggregation and conditional iteration of message for a queue with regard to enqueue/dequeue commands received from remote device 102a and/or remote device 102b of system 100 in FIG. 1. In embodiments, flowchart 700 may be a further embodiment of flowchart 300 of FIG. 3. Further structural and operational examples will be apparent to persons skilled in the relevant art(s) based on the following description. Flowchart 700 is described as follows.

In step 702, the valid message is dequeued from the second data page. For example, enqueue/dequeue logic 220 of FIG. 2 is configured to dequeue messages from a queue, such as queue 400 of FIG. 4. In embodiments, subsequent to step 312 of flowchart 300 in FIG. 3, where a data page is bypassed for having no valid (only expired) messages to locate the enqueued valid message identified in the dequeue command/request (e.g., starting a message comparison/check at the next valid message enqueued), enqueue/dequeue logic 220 is configured to dequeue the desired message. Continuing with the example above, if message 408 is identified in the received dequeue command/request, enqueue/dequeue logic 220 dequeues message 408 at dequeue operation 416 of FIG. 4. Indications of messages and/or messages to be dequeued from queue 400 by enqueue/dequeue logic 220 may be transmitted to remote device 102a and/or remote device 102b via I/O interface 218. In embodiments, dequeue indications from queues such as queue 400 may be received by software entities of remote devices, e.g., remote device 102a and/or remote device 102b, responsive to dequeue requests for enqueued messages being fulfilled using one or more application programming interfaces (APIs) associated with the software entities.

In step 704, the dequeued valid message is marked as having been dequeued and as invalid. For example, enqueue/dequeue logic 220 of FIG. 2 is configured to mark dequeued messages as dequeued and/or invalid. In some embodiments, iterator logic 502 of FIG. 5 may be configured to bypass dequeued messages thus marked.

As noted above, when aggregation of one or more data pages in a queue is completed, latest expiry times for data pages linked a give index page may be determined, and max times, i.e., latest expiry times, for the set of data pages linked to an index page may be determined by further aggregation and stored with the index page.

Figure 8:
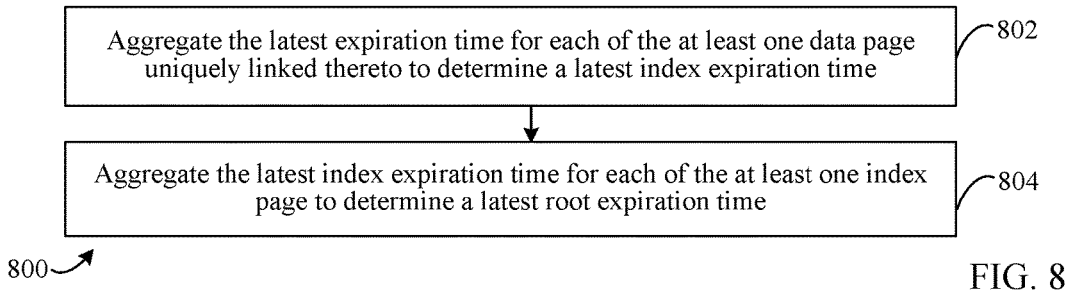
FIG. 8 shows a flowchart for dequeue optimization using conditional iteration, according to an example embodiment.

In FIG. 8, a flowchart 800 for dequeue optimization using aggregation and conditional iteration is shown, according to an example embodiment. For purposes of illustration, flowchart 800 of FIG. 8 is described with respect to system 200 of FIG. 2 and its subcomponents, and also with reference to FIGS. 4 and 5. That is, host server 200 of FIG. 2 may perform various functions and operations in accordance with flowchart 800 for dequeue optimization using aggregation and conditional iteration of message for a queue with regard to enqueue/dequeue commands received from remote device 102a and/or remote device 102b of system 100 in FIG. 1. In embodiments, flowchart 800 may be a further embodiment of flowchart 300 of FIG. 3, e.g., of step 304. Further structural and operational examples will be apparent to persons skilled in the relevant art(s) based on the following description. Flowchart 800 is described as follows.

In step 802, the latest expiration time for each of the at least one data page uniquely linked thereto is aggregated to determine a latest index expiration time, and in step 804, the latest index expiration time for each of the at least one index is aggregated to determine a latest root expiration time. For instance, aggregator logic 522 is configured to aggregate a latest expiration time for each data page uniquely linked to an index page to determine a latest index expiration time for that index page, and to aggregate the latest index expiration time for index pages to determine a latest root expiration time for a root page.

Continuing the with example above, expired messages for data pages containing enqueued messages, e.g., data page 510a, data page 510b, to data page 510k, as appropriate, are aggregated by aggregator logic 522 according to step 304 of FIG. 3 and step 802. That is, any data page linked to an index page of a queue may be aggregated by aggregator logic 522 to determine a latest expiry time, according to embodiments. In the example, data page 510a and data page 510b have messages enqueued, and data page 510b includes the message with the latest expiry time of the data pages under index page 508a, as described above, as determined by aggregator logic 522. While the example scenario described herein only provides for enqueued messages in data page 510a and data page 510b, it is contemplated herein that any combination of data pages may include messages upon which aggregation may be performed by aggregator logic 522. In embodiments, aggregator logic 522 is configured to bypass aggregation for a data page that does not have messages enqueued therein, e.g., based on an indicator stored by the data page or its linked index page by one or more components of queue logic 408 of FIG. 4.

Likewise, aggregator logic 522 is configured to aggregate latest expiry times for sets of index pages linked to a root page to determine a max time for all enqueued messages under the root page on a per-index page basis. For instance, max time 518*a* of index page 506*a*, max time 518*b* of index page 506*b*, and max time 518*n* of index page 506*n*, represent the latest time that a message queued under the respective index pages has expired or will expire. Aggregator logic 522 is configured to compare the max times of the index pages to determine the latest expiry time over the set of index pages.

That is, in embodiments, an index page such as index page 506*a* may be configured to store a max time for each data page linked thereto. Similarly, each root page such as root page 504 may be configured to store a max time for each index page linked thereto. In this way, iterator logic 502 may be configured to determine the data page for the next valid message by interrogating the linked index page and without having to interrogate data pages for their respective max times.

It should be noted that in embodiments, any index page may have a linked data page in which a message with the latest overall expiry time is enqueued due to the wrap-around nature of queue mechanisms (e.g., the head and tail of a queue).

Based on the aggregated messages and determined latest expiry times, i.e., the max times described with respect to a FIG. 5, data pages, index pages, and root pages may have overall latest expiry times respectively associated therewith stored.

Figure 9:
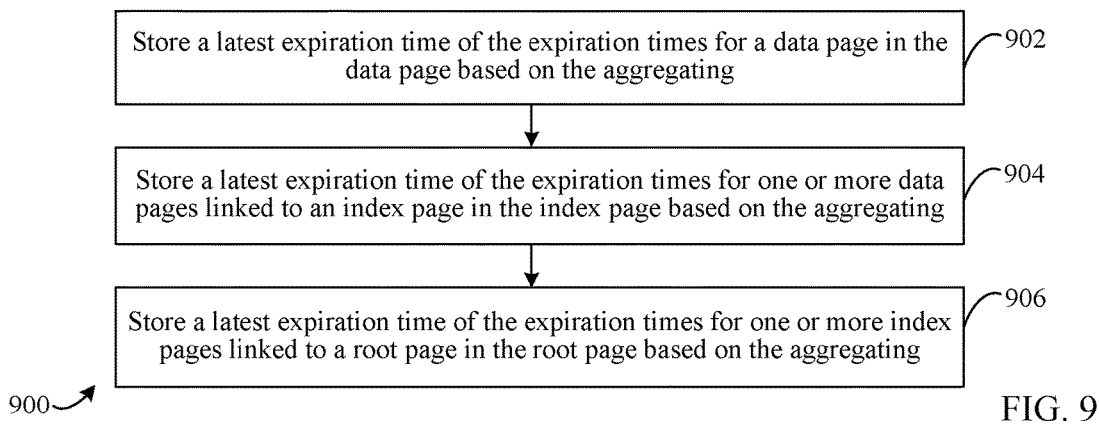
FIG. 9 shows a flowchart for dequeue optimization using conditional iteration, according to an example embodiment.

In FIG. 9, a flowchart 900 for dequeue optimization using aggregation and conditional iteration is shown, according to an example embodiment. For purposes of illustration, flowchart 900 of FIG. 9 is described with respect to system 200 of FIG. 2 and its subcomponents, and also with reference to FIGS. 4 and 5. That is, host server 200 of FIG. 2 may perform various functions and operations in accordance with flowchart 900 for dequeue optimization using aggregation and conditional iteration of message for a queue with regard to enqueue/dequeue commands received from remote device 102*a* and/or remote device 102*b* of system 100 in FIG. 1. In embodiments, flowchart 900 may be a further embodiment of flowchart 300 of FIG. 3, e.g., of step 306, and may be a continuation of flowchart 800 of FIG. 8. Further structural and operational examples will be apparent to persons skilled in the relevant art(s) based on the following description. Flowchart 900 is described as follows.

In step 902, a latest expiration time of the expiration times for a data page is stored in the data page based on the aggregating. For example, as noted above, any data page of a queue may be aggregated by aggregator logic 522, as similarly described above with respect to step 306 of FIG. 3 and/or step 604 of FIG. 6, regardless of the number of data pages and/or how many data pages are in a set that is linked to a given index page. Subsequent to aggregation and determination of the latest expiration times for the set of data pages, e.g., as in step 802, aggregator logic 522 is configured to store the latest expiration times as the max times for each data page, e.g., as described for max time 520*a* of data page 510*a*. Aggregator logic 522 is also configured to store the latest expiration time for any other data pages, e.g., data page 510*b* to data page 510*k*.

In step 904, a latest expiration time of the expiration times for one or more data pages linked to an index page is stored in the index page based on aggregating. As similarly described in step 902 for data pages, any index page of a queue may be aggregated by aggregator logic 522. Subsequent to aggregation and determination of the latest expiration time for the set of data pages for an index page, e.g., as in step 804, aggregator logic 522 is configured to store the latest expiration time as the max time for the index page, e.g., as described for max time 518*a* of index page 506*a*. Aggregator logic 522 is also configured to store the latest expiration time for the set of data pages for each index page, e.g., index page 506*b* to index page 506*n*.

In step 906, a latest expiration time of the expiration times for one or more index pages linked to a root page is stored in the root page based on the aggregating. Again, as similarly described in steps 902 and 904 for data and index pages, any root page of a queue may be aggregated by aggregator logic 522. Subsequent to aggregation and determination of the latest expiration time for a set of index pages, aggregator logic 522 is configured to store the latest expiration time as the max time for the root page, e.g., as described for max time 516 of root page 504.

Figure 10:
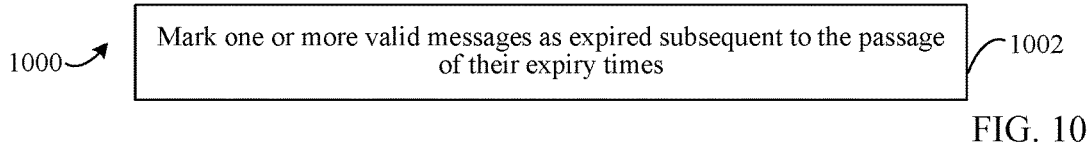
FIG. 10 shows a flowchart for dequeue optimization using conditional iteration, according to an example embodiment.

Turning now to FIG. 10, a flowchart 1000 for dequeue optimization using aggregation and conditional iteration is shown, according to an example embodiment. For purposes of illustration, flowchart 1000 of FIG. 10 is described with respect to system 200 of FIG. 2 and its subcomponents, and also with reference to FIGS. 4 and 5. That is, host server 200 of FIG. 2 may perform various functions and operations in accordance with flowchart 1000 for dequeue optimization using aggregation and conditional iteration of message for a queue with regard to enqueue/dequeue commands received from remote device 102*a* and/or remote device 102*b* of system 100 in FIG. 1. In embodiments, flowchart 1000 may be a further embodiment of flowchart 300 of FIG. 3. Further structural and operational examples will be apparent to persons skilled in the relevant art(s) based on the following description. Flowchart 1000 is described as follows.

In step 1002, one or more valid messages are marked as expired subsequent to the passage of their expiry times. For example, expiry logic 214 of FIG. 2 is configured to mark one or more valid messages as expired subsequent to the passage of their expiry times, according to embodiments. As shown in queue 400 of FIG. 4, message 402, message 404, and message 406 are each expired as their expiry times are earlier than current time 412. In embodiments, expiry logic 214 marks or denotes each of these expired messages as "expired" by setting a flag or other indicator after, or as, current time passes the respective expiry times of the messages. It should be noted that messages with common expiry times may be concurrently marked or denoted as being expired by expiry logic 214. Once a message is marked/denoted as being expired, such a message may be aggregated by aggregator logic 522, as described above.

In embodiments, expiry logic 214 may set a default expired status of "No" or "N" or the like for a message when the message is enqueued.

As described in the follow subsection, queues such as queue 400 of FIG. 4, may be stored and maintained in storage trees, and in embodiments, queues are implemented as tree structures, such as but not limited to, large structure merged (LSM) trees.

B. Example Storage Tree Embodiments

As previously noted, systems and devices may be enabled in various ways for dequeue optimization using aggregation and conditional iteration according to embodiments. For example, system 200 of FIG. 2 may be configured to provide, execute, and maintain queues according to the described techniques and embodiments by utilizing storage trees, e.g., a queue may be configured as a tree structure, according to embodiments. Storage trees, as described herein, may be hierarchical storage organization mechanisms employed in one or more storage devices, including distributed and cloud storage, of cloud services, data storage farms, servers and/or server clusters, etc. Storage trees may store and/or implement zero or more queues, e.g., queue 400 of FIG. 4, according to embodiments. In some embodiments, storage trees may be large structure merged (LSM) trees.

Figure 11:
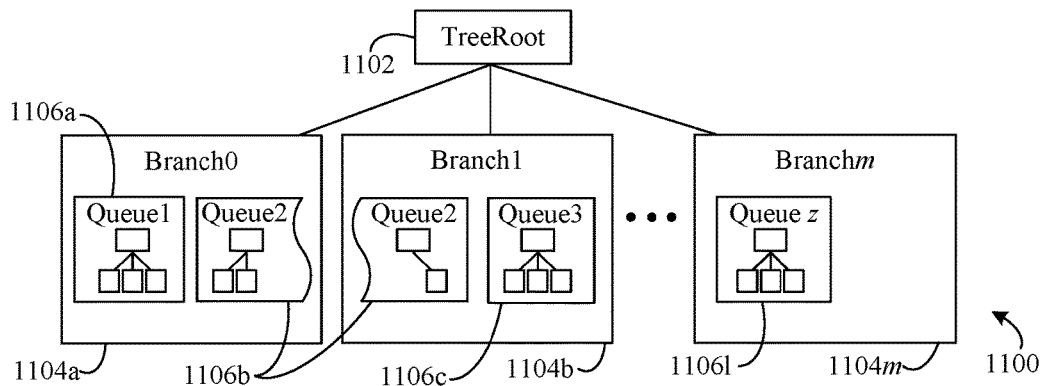
FIG. 11 shows a block diagram for a storage tree, according to an example embodiment.

In FIG. 11, a block diagram for a storage tree 1100 is shown, according to an example embodiment. In embodiments, storage tree 1100 may be a part of memory 206 of FIG. 2 and/or another accessible memory/storage, such as external/network storage. According to the exemplary, illustrated embodiment, storage tree 1100 includes a tree root 1102 and a plurality of branches: a branch 1104*a*, a branch 1104*b*, to a branch 1104*m*, although it is contemplated herein that any number of branches may be included in a given storage tree in various embodiments.

The illustrated branches of storage tree 1100 in FIG. 11 are linked to tree root 1102 in a hierarchical manner as would be understood by persons of skill in the relevant art(s) having the benefit of this disclosure. Branch 1104*a*, branch 1104*b*, and branch 1104*m* may be defined or bounded logically (e.g., based on partition size), physically (e.g., based on storage device size), or based on implementation requirements/desires for storage tree 1100.

The branches of storage tree 1100 are configured to store, provide execution functions for, and/or maintain queues, as described herein. For example, according to embodiments, queue data 222 of FIG. 2 may be stored in one or more branches of a storage tree such as storage tree 1100. As illustrated, storage tree 1100 includes a plurality of queues: a queue 1106*a* in branch 1104*a*, a queue 1106*b* in branch 1104*a* and branch 1104*b*, a queue 1106*c* in branch 1104*b*, to a queue 1106*z* in branch 1104*m*. One or more of these queues may be a further embodiment of queue 400 of FIG. 4. According to embodiments, the data pages of the queues may correspond to leaves of storage tree 1100.

In embodiments of storage tree 1100, system 200 of FIG. 2 may be a server(s) or other computing device within the same fabric or cluster as storage tree 1100, and multiple instances of host server 202 or queue logic 208 may be utilized in conjunction with one or more instances of storage tree 1100. For instance, system 200 may implemented in conjunction with storage tree 1100, with various instances of combinations therefor, to support multiple projects that utilize message queuing. In such embodiments, I/O interface 218 may receive enqueue commands and transmit dequeued messages, while other subcomponents of system 200 such as queue logic 208, aggregator logic 210, iterator logic 212, expiry logic 214, timeout logic 216, and/or enqueue/dequeue logic 220, may perform their respective functions as related to a queue, e.g., queue 400, by accessing the queue through the root page tree root 1102 and the branch(es) in which the queue is stored.

III. Example Processor-Based Computer System Implementation

The embodiments and techniques described herein may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC) or ASIC.

Figure 12:
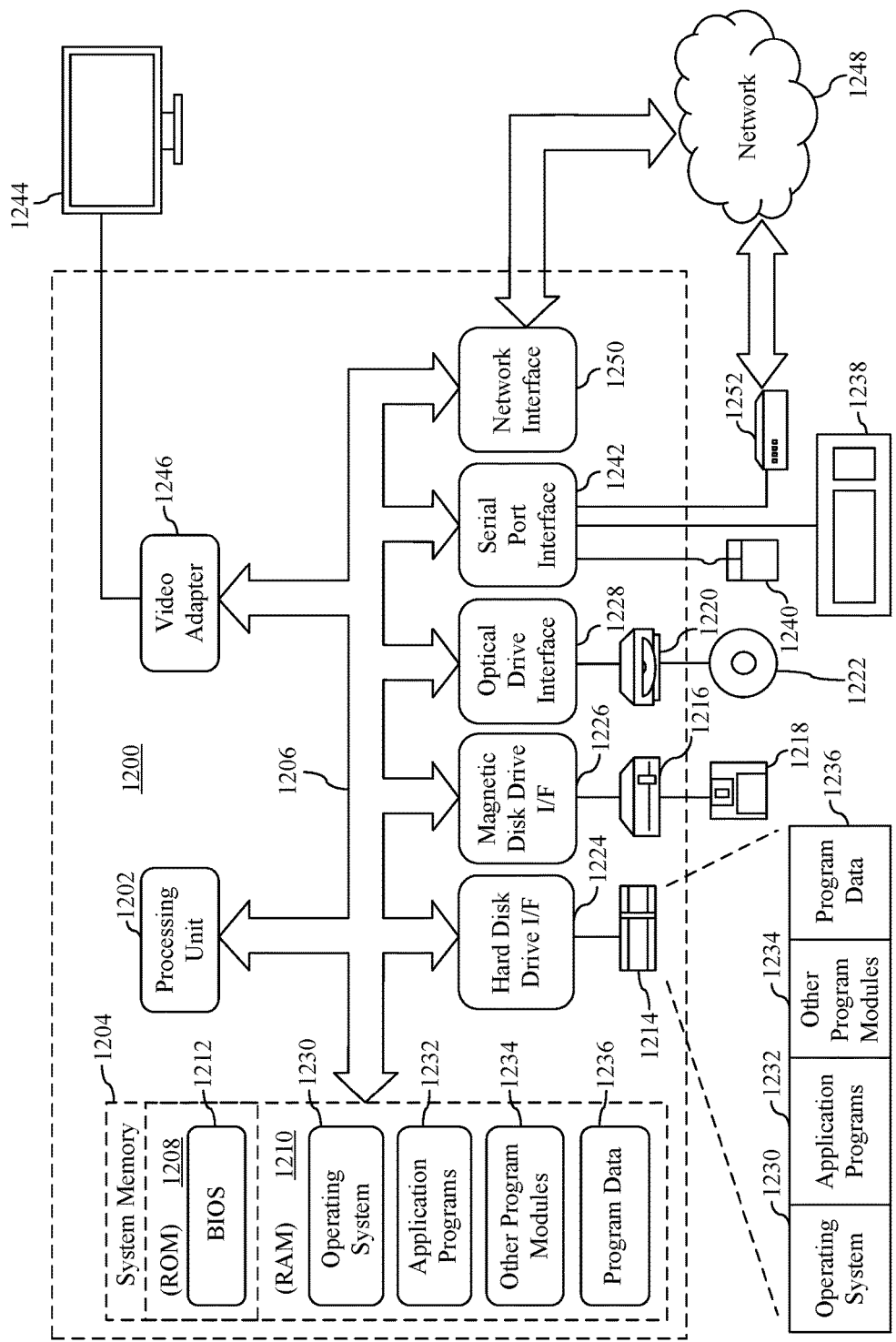
FIG. 12 shows a block diagram of an example processor-based computer system that may be used to implement various example embodiments.

FIG. 12 depicts an example processor-based computer system 1200 that may be used to implement various examples described herein. For example, system 1200 may be used to implement any server, host, system, remote device, mobile/personal device, etc., as described herein. System 1200 may also be used to implement any of the steps of any of the flowcharts, as described herein. The description of system 1200 provided herein is provided for purposes of illustration, and is not intended to be limiting. Examples may be implemented in further types of computer systems, as would be known to persons skilled in the relevant art(s).

As shown in FIG. 12, system 1200 includes a processing unit 1202, a system memory 1204, and a bus 1206 that couples various system components including system memory 1204 to processing unit 1202. Processing unit 1202 may comprise one or more circuits, microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various examples, the program modules may include computer program logic that is executable by processing unit 1202 to perform any or all of the functions and features of any technique or example described herein, including computer program logic. The program modules may also include computer program logic that, when executed by processing unit 1202, causes processing unit 1202 to perform any of the steps of any of the flowcharts, as described above.

A user may enter commands and information into system 1200 through input devices such as a keyboard 1238 and a pointing device 1240 (e.g., a mouse). Other input devices (not shown) may include a microphone, joystick, game controller, scanner, or the like. In one example, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

Display 1244 is connected to bus 1206 via an interface, such as a video adapter 1246. In addition to display 1244, system 1200 may include other peripheral output devices (not shown) such as speakers and printers.

System 1200 is connected to a network 1248 (e.g., a local area network or wide area network such as the Internet) through a network interface 1250, a modem 1252, or other suitable means for establishing communications over the network. Modem 1252, which may be internal or external, is connected to bus 1206 via serial port interface 1242.

As used herein, the terms "computer program medium," "computer-readable medium," and/or "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable media/storage media are distinguished from and non-overlapping with communication media, software programs, and transitory signals (do not include communication media, software programs, or transitory signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Examples are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable systems to implement features of examples discussed herein. Accordingly, such computer programs represent controllers of the system 1200. Examples are also directed to computer program products comprising software stored on any computer useable medium. Such software, when executed in one or more data processing devices, causes a data processing device(s) to operate as described herein. Examples may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IV. Additional Example Advantages and Embodiments

As described, systems and devices embodying the techniques herein may be configured in various ways to perform their respective functions. In embodiments, one or more of the steps or operations of any flowchart described herein may not be performed. Moreover, steps or operations in addition to or in lieu of those in any flowchart described herein may be performed. Further, in examples, one or more operations of any flowchart described herein may be performed out of order, in an alternate sequence, or partially (or completely) concurrently with each other or with other operations.

The embodiments and techniques described herein provide improved performance of computing devices and operations executing thereon for dequeue optimization using aggregation and conditional iteration. For instance, the described embodiments and techniques provide for increased efficiency, e.g., faster returns for dequeue commands, in dequeuing messages from queues using aggregation and conditional iteration, as described herein. Additionally, system lock ups and timeouts are reduced due to more efficient dequeuing of messages. Accordingly, fewer processing cycles are required by the system in performing dequeue operations because of the bypassing technique for pages having only expired messages, and system memory is freed more quickly because fewer comparisons/identifications are required to locate a message to be dequeued thus reducing the required memory footprint. Still further, project management is improved in such systems based on the efficiencies noted above which improve overall dequeue and project progression times and reduce resource conflicts for developers and/or software entities seeking to dequeue messages by avoiding system lock ups and extended message search times.

The additional examples described in this Section may be applicable to examples disclosed in any other Section or subsection of this disclosure.

A computer-implemented method for dequeuing messages in a queue that is temporally ordered is described herein. The method includes queuing at least one valid message, each having an expiry time, in the second data page in the queue that includes a first index page of the queue linked with a first data page of the queue and a second data page of the queue, and having first expired messages that were previously queued stored in the first data page. The method also includes aggregating the first expired messages for the first data page to determine a first latest expiration time for the first expired messages in the first data page, and storing the first latest expiration time in the first data page and in the first index page based on the aggregating. The method further includes receiving by the queue a dequeue request to dequeue a valid message of the at least one valid message, determining a next valid message is in the second data page based on a comparison of a current time and at least the first latest expiration time, and bypassing the first data page to dequeue the valid message, corresponding to the dequeue request, from the second data page.

In an embodiment, the method also includes dequeuing the valid message from the second data page, and marking the dequeued valid message as having been dequeued and as invalid.

In an embodiment of the method, one or more of said determining, said bypassing, or said dequeuing is aborted based on a timeout timer elapsing from a time of said receiving.

In an embodiment of the method, the second data page includes the at least one valid message and at least one second expired message. In the embodiment, aggregating further comprises aggregating the at least one second expired message for the second data page to determine a second latest expiration time for the at least one second expired message. In the embodiment, storing further comprises storing the second latest expiration time in the second data page based on the aggregating.

In an embodiment, the method includes receiving at least one enqueue request to queue the at least one valid message, each of the at least one enqueue request including a message-specific value for the expiry time, and marking the valid message as expired subsequent to the passage of the expiry time. In an embodiment of the method, two of the at least one enqueue request comprise the message-specific value for at least one respective expiry time, and the method further includes marking the two of the at least one enqueue request as expired subsequent to the passage of the expiry time, wherein the two of the at least one enqueue request that have a common expiry time are aggregated together, subsequent to expiring, during aggregating.

In an embodiment of the method, the queue is maintained in a storage tree comprising zero or more additional queues, where the queue is configured as a tree structure, and the request comprises a name of the queue. In the embodiment, the method further includes locating the queue in the storage tree based on the name of the queue prior to the determining.

A system for dequeuing messages in a queue that is temporally ordered, is also described. The system includes at least one non-volatile storage device configured to store queue logic for providing and managing the queue, the queue being configured to include at least one data page. The system also includes at least one processor configured to perform operations on the queue based on the queue logic. The queue logic of the system includes enqueue logic configured to enqueue at least one valid message, each having an expiry time, in a tail data page of the least one data page that includes a tail of the queue. The queue logic also includes aggregator logic configured to, for each of the at least one data page, aggregate expired messages to determine an expiration time of the expired messages of the at least one data page, and store a latest expiration time, the latest expiration time representing a latest value of the aggregated expired messages of its associated data page, with its associated data page. The queue logic also includes dequeue logic configured to receive a dequeue request to dequeue a valid message of the at least one valid message, and iterator logic configured to determine a queue location in one of the at least one data page for a next valid message based on a comparison of a current time and the latest expiration time for one or more of the at least one data page, and bypass one or more of the at least one data page to dequeue the valid message from a data page that includes the queue location of the at least one data page.

In an embodiment of the system, the queue is configured to include at least one index page and each of the at least one data page is uniquely linked to one of the at least one index page, and the aggregator logic is configured to, for each of the at least one index page, aggregate the latest expiration time for each of the at least one data page uniquely linked thereto to determine a latest index expiration time, and store the latest index expiration time in its associated index page of the at least one index page according to the aggregated latest expired times. In the embodiment, the iterator logic configured to determine a queue location in one of the at least one data page for the next valid message based on a comparison of the current time and the latest index expiration time, and bypass one or more of the at least one index page to dequeue the valid message.

In an embodiment of the system, the queue is configured to include at least one root page to which each of the at least one index page is uniquely linked, and the aggregator logic is configured to aggregate the latest index expiration time for each of the at least one index page to determine a latest root expiration time, and store the latest index expiration time in its associated root page of the at least one root page according to the aggregated latest index expired times. In the embodiment, the iterator logic is configured to determine a queue location in one of the at least one data page for the next valid message based on a comparison of the current time and the latest root expiration time, and bypass one or more of the at least one root page to dequeue the valid message.

In an embodiment, the system includes dequeue logic configured to dequeue the valid message from the data page that includes the queue location, and mark the dequeued valid message as having been dequeued and as invalid, where the queue has a tree structure.

In an embodiment, the system further includes timeout logic configured to abort one or more operations of the iterator logic or the dequeue logic based on a timeout timer elapsing from a time of said receiving.

In an embodiment of the system, the request comprises a message-specific value for the expiry time, and the system includes expiry logic configured to mark the next valid message as expired subsequent to the passage of the expiry time. In an embodiment, at least one additional request also comprises the message-specific value for at least one respective expiry time, and the expiry logic is configured to mark the at least one additional request as expired subsequent to the passage of the expiry time. In the embodiment, the aggregator logic is configured to aggregate messages that have a common expiry time together subsequent to expiring.

In an embodiment, the system includes a storage tree configured to store and maintain the queue and zero or more additional queues, the queue being configured as a tree structure, and the iterator logic is configured to locate the queue in the storage tree based on a name of the queue provided in the request.

A computer readable memory storing program instructions that, when executed by one or more processing devices, perform a method, is also described. The method includes aggregating expired messages in a queue to determine expiration times for the expired messages, the queue comprising a first index page, and a first data page and a second data page linked with the first index page. The method also includes determining a location in the queue for a next valid message based on a comparison of a current time and the expiration times, and bypassing at least one of an index page of the queue, or a data page of the queue to dequeue a valid message based on the location.

In an embodiment, the method includes storing a latest expiration time of the expiration times for the data page in the data page based on the aggregating, determining comprises comparing the current time to the latest expiration time, and bypassing comprises bypassing the data page when the latest expiration time is before the current time.

In an embodiment, the method includes storing a latest expiration time of the expiration times for one or more data pages linked to the index page, including the data page, in the index page based on the aggregating, determining comprises comparing the current time to the latest expiration time, and bypassing comprises bypassing the index page when the latest expiration time is before the current time.

In an embodiment, the method includes dequeuing the valid message based on the location, and marking the dequeued valid message as having been dequeued and as invalid, where the queue has a tree structure.

In an embodiment, the method includes receiving a request to enqueue the next valid message that comprises a message-specific value for an expiry time, marking the next valid message as expired responsive to the passage of the expiry time, and subsequently aggregating the expired messages in the queue again to determine updated expiration times for the expired messages.

V. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. A computer readable storage medium storing program instructions that, when executed by one or more processing devices, perform a method, the method comprising:
    aggregating expired messages in a queue to determine expiration times for the expired messages, the queue comprising a first index page, and a first data page and a second data page linked with the first index page;
    determining a location in the queue for a next valid message based on a comparison of a current time and the expiration times; and
    bypassing at least one of an index page of the queue, or a data page of the queue to dequeue a valid message based on the location.

2. The computer readable storage medium of claim 1, the method further comprising:
    storing a latest expiration time of the expiration times for the data page in the data page based on the aggregating;
    wherein said determining comprises comparing the current time to the latest expiration time; and
    wherein said bypassing comprises bypassing the data page when the latest expiration time is before the current time.

3. The computer readable storage medium of claim 1, the method further comprising:
    storing a latest expiration time of the expiration times for one or more data pages linked to the index page, including the data page, in the index page based on the aggregating;
    wherein said determining comprises comparing the current time to the latest expiration time; and
    wherein said bypassing comprises bypassing the index page when the latest expiration time is before the current time.

4. The computer readable storage medium of claim 1, the method further comprising:
    dequeuing the valid message based on the location; and
    marking the dequeued valid message as having been dequeued and as invalid;
    wherein the queue comprises a tree structure.

5. The computer readable storage medium of claim 1, the method further comprising:
    receiving a request to enqueue the next valid message that comprises a message-specific value for an expiry time;
    marking the next valid message as expired responsive to the passage of the expiry time; and
    subsequently aggregating the expired messages in the queue again to determine updated expiration times for the expired messages.

6. The computer readable storage medium of claim 1, wherein the method further comprises:
    aborting at least one of said determining or said bypassing based on a timeout timer elapsing from a time of receiving a request to dequeue the valid message.

7. A system comprising:
    at least one non-volatile storage device configured to store program logic configured to:
        aggregate expired messages in a queue to determine expiration times for the expired messages, the queue comprising a first index page, and a first data page and a second data page linked with the first index page;
        determine a location in the queue for a next valid message based on a comparison of a current time and the expiration times; and
        bypass at least one of an index page of the queue, or a data page of the queue to dequeue a valid message based on the location.

8. The system of claim 7, wherein the program logic configured to:
    store a latest expiration time of the expiration times for the data page in the data page based on the aggregating;
    determine the location by comparing the current time to the latest expiration time; and
    bypass by bypassing the data page when the latest expiration time is before the current time.

9. The system of claim 7, wherein the program logic configured to:
    store a latest expiration time of the expiration times for one or more data pages linked to the index page, including the data page, in the index page based on the aggregating;
    determine the location by comparing the current time to the latest expiration time; and
    bypass by bypassing the index page when the latest expiration time is before the current time.

10. The system of claim 7, wherein the program logic configured to:
    dequeue the valid message based on the location; and
    mark the dequeued valid message as having been dequeued and as invalid;
    wherein the queue comprises a tree structure.

11. The system of claim 7, wherein the program logic configured to:
    receive a request to enqueue the next valid message that comprises a message-specific value for an expiry time;
    mark the next valid message as expired responsive to the passage of the expiry time; and
    subsequently aggregate the expired messages in the queue again to determine updated expiration times for the expired messages.

12. The system of claim 7, wherein the program logic configured to:
    abort at least one of said determining or said bypassing based on a timeout timer elapsing from a time of receiving a request to dequeue the valid message.

13. The system of claim 7, wherein the queue comprises a tree structure.

14. A computer-implemented method comprising:
    aggregating expired messages in a queue to determine expiration times for the expired messages, the queue comprising a first index page, and a first data page and a second data page linked with the first index page;
    determining a location in the queue for a next valid message based on a comparison of a current time and the expiration times; and bypassing at least one of an index page of the queue, or a data page of the queue to dequeue a valid message based on the location.

15. The computer-implemented method of claim 14, the method further comprising:
    storing a latest expiration time of the expiration times for the data page in the data page based on the aggregating;
    wherein said determining comprises comparing the current time to the latest expiration time; and
    wherein said bypassing comprises bypassing the data page when the latest expiration time is before the current time.

16. The computer-implemented method of claim 14, the method further comprising:
    storing a latest expiration time of the expiration times for one or more data pages linked to the index page, including the data page, in the index page based on the aggregating;
    wherein said determining comprises comparing the current time to the latest expiration time; and
    wherein said bypassing comprises bypassing the index page when the latest expiration time is before the current time.

17. The computer-implemented method of claim 14, the method further comprising:
    dequeuing the valid message based on the location; and
    marking the dequeued valid message as having been dequeued and as invalid.

18. The computer-implemented method of claim 14, the method further comprising:
    receiving a request to enqueue the next valid message that comprises a message-specific value for an expiry time;
    marking the next valid message as expired responsive to the passage of the expiry time; and
    subsequently aggregating the expired messages in the queue again to determine updated expiration times for the expired messages.

19. The computer-implemented method of claim 14, wherein the method further comprises:
    aborting at least one of said determining or said bypassing based on a timeout timer elapsing from a time of receiving a request to dequeue the valid message.

20. The computer-implemented method of claim 14, wherein the queue comprises a tree structure.

* * * * *